United States Patent [19]
Cameron

[11] Patent Number: 5,844,390
[45] Date of Patent: Dec. 1, 1998

[54] METHOD AND APPARATUS FOR REGULATING A FLUID OPERATED MACHINE

[76] Inventor: Robert Cameron, 431 Itasca Rd., Wood Dale, Ill. 60191

[21] Appl. No.: 789,520

[22] Filed: Jan. 27, 1997

[51] Int. Cl.⁶ .................................................. G05B 9/03
[52] U.S. Cl. ................ 318/564; 318/565; 318/632; 60/327; 91/361; 91/362; 91/363 A; 364/167
[58] Field of Search .................... 318/560–640; 60/327, 388, 407, 410, 415, 418; 91/361, 429, 444, 362, 363 A; 364/167

[56] References Cited

U.S. PATENT DOCUMENTS

| | | | |
|---|---|---|---|
| 3,788,425 | 1/1974 | Balogh . | |
| 4,138,632 | 2/1979 | Pauwels et al. | 318/599 |
| 4,335,867 | 6/1982 | Bihlmaier . | |
| 4,443,853 | 4/1984 | Maciolek et al. | 364/434 |
| 4,447,769 | 5/1984 | Corney | 318/564 |
| 4,481,768 | 11/1984 | Goshorn et al. | 60/327 |
| 4,510,846 | 4/1985 | Gazzera . | |
| 4,589,199 | 5/1986 | Ohtaki . | |
| 4,594,537 | 6/1986 | Arifian et al. | 318/564 |
| 4,628,499 | 12/1986 | Hammett | 318/657 |
| 4,714,005 | 12/1987 | Leemhuis . | |
| 4,723,356 | 2/1988 | Sakamoto . | |
| 4,736,515 | 4/1988 | Catena . | |
| 4,741,247 | 5/1988 | Glomeau . | |
| 4,756,229 | 7/1988 | Drakeley . | |
| 4,757,745 | 7/1988 | Taplin . | |
| 4,788,483 | 11/1988 | Smith | 318/689 |
| 4,807,516 | 2/1989 | Takats | 91/363 |
| 4,894,908 | 1/1990 | Haba . | |
| 4,915,281 | 4/1990 | Berger . | |
| 4,924,996 | 5/1990 | Svensson . | |
| 4,939,838 | 7/1990 | Gatta . | |
| 4,976,026 | 12/1990 | Dacey . | |
| 5,005,277 | 4/1991 | Uemura . | |
| 5,023,535 | 6/1991 | Miller et al. | 318/599 |
| 5,115,640 | 5/1992 | Stephenson . | |
| 5,121,042 | 6/1992 | Ako | 318/657 |
| 5,150,624 | 9/1992 | Kaczmarek . | |
| 5,271,313 | 12/1993 | Lindegren . | |
| 5,381,597 | 1/1995 | Petrove . | |

*Primary Examiner*—Paul Ip
*Attorney, Agent, or Firm*—Patnaude, Videbeck, Marsh

[57] ABSTRACT

A fluid operated machine is monitored and regulated by providing a logic with a memory for storing the timings of properly operating functions, and detectors the outputs of which are used to calculate the actual operating timings of the functions. The actual operating timings are compared to the timings in the memory, and if they deviate beyond acceptable tolerances a warning signal is given. In addition to monitoring the timings, the device will also open or close control flow valves to bring the operating speeds of functions within acceptable tolerances.

5 Claims, 3 Drawing Sheets

METHOD AND APPARATUS FOR REGULATING A FLUID OPERATED MACHINE

The present invention relates to a method of regulating a mechanical machine, and in particular, to regulating a machine having fluid operated functions.

BACKGROUND OF THE INVENTION

Many machines which carry on a multitude of functions in sequential relationship employ electric motors or servos which run at predetermined speeds with the timing of the commencement and termination of the servos controlled by a programmable control. The servos and other electronic features which automate such machines, however, are expensive, and servo operated machines are, therefore, costly.

Many older machines which carry on a multitude of functions, and less expensive newer machines which do not incorporate servo technology, employ hydraulic or pneumatic cylinders and motors to operate the various functions.

The functions of existing fluid operated machines are controlled by solenoids and a programmable logic or by mechanical linkages which open and close valves to control the flow of fluid into and out of the motors and cylinders thereof. For example, where a machine has a first function carried out by a first cylinder followed by a second function carried out by a second cylinder, the full extension of the first cylinder may cause a valve to open to start the second function. Similarly, the full extension of a second cylinder may open a valve to commence a third function, and so forth. When each cylinder reaches the the end of its travel, the fully extended cylinder may also cause the valves to reverse the flow of fluid through that cylinder, and thereby causing it to retract. In similar fashion, when the first cylinder returns to its fully retracted position, it may cause another valve to reverse the flow of fluid and causing the cylinder to commence another cycle. The proper operation of a machine may require that the first function be completed before a second function can commence, and the second function should finish before the third cycle commenced, in a sequential relationship, or it may require the simultaneous performance of several functions which must be carried out in some relationship to one another.

A problem arises, however, if the movement of the various cylinders becomes out of synchronization. For example, if a second cylinder is to be in a retracted position when a first cylinder reaches the end of its travel, then it is necessary that the second cylinder be fully retracted before the first cylinder has reached the end of its travel. But if the second cylinder moves slower than the first cylinder, the second cylinder may not be fully retracted before the first cylinder reaches the end of its travel, and the machine will not function properly. The synchronization or timing of the functions becomes more complicated when the parts thereof are moving too rapidly for an operator to find a problem by a visual inspection of the running machine. For example, a piston may have a stroke as short as one-eighth inch and a period of ten milliseconds.

Where a machine incorporates a number of functions, a timing problem within the machine may cause the machine to become unreliable, to cause breakage of parts, or to produce parts of inferior quality. Also, where there are a number of functions carried out by the machine, it may be very difficult to determine which function has caused the malfunction. The repair of a fluid operated machine having a number of functions can be extremely time consuming and expensive because of the difficulty of isolating and correcting a timing problem. Even after a timing problem has been isolated, it is often difficult to correct the problem because altering the flow rate of fluid to the valves of one cylinder may change the time available to complete another function such that rectifying a first problem may generate a second problem.

It would, therefore, be desirable to provide a method and apparatus whereby the functions of a fluid operated machine can be monitored to determine whether the various functions of the machine are being carried out within the allocated time therefor. It would also be desirable to provide a device which could regulate the valves which adjust the flow of liquid to the functions to increase or decrease the speeds of such functions as needed to correct a timing problem.

SUMMARY OF THE INVENTION

Briefly, the present invention is embodied in a method and apparatus for monitoring and regulating a machine having a number of fluid operated functions. Such a machine has a first fluid operated function with a first start position and a first end position, a second fluid operated function with a second start position and a second end position. The functions may have any of a number of relationships to one another, for example, the machine may require that the first function be completed prior to commencement of the second function, and that the second function be completed prior to commencement of a new cycle of the first function.

In accordance with the present invention, a first detector is provided for detecting when the first function is in its start position, a second detector is provided to determine when the first function is in its end position, a third detector is provided for determining when a second function is in its start position, and a fourth detector is provided for detecting when the second function is in its end position. A logic, such as a computer, is also provided which is responsive to the outputs of the first, second, third, and fourth detectors.

The logic, or computer, includes a memory, and stored within the memory are the timings allotted for each of the functions, and acceptable deviations, required for proper operation of the machine with the functions thereof operating in proper relationship to one another. The logic also records the output of the detectors and calculates average timings of the functions and compares them to the timing of the functions of a properly operating machine.

In accordance with one embodiment of the invention, a warning device is connected to the logic for generating a warning signal when the logic has determined that one of the functions is not operating within the allowed deviation.

Fluid operated machines are adjusted by opening or closing a fluid control valve to increase or decrease the rate of liquid flowing to the various functions. In another embodiment of the invention, electronic controls are attached to manually operated flow control valves to each of the functions of a machine and all of the electronic controls are connected to the logic. Each flow control valve has a stem which is connected to an associated control and the stem is rotated by a gear train driven by a D.C. electric motor. A potentiometer also connected to the gear train provides feedback to the logic as to the setting of the valve.

In the event the detectors indicate that a function is not operating within the allowable timing, the logic will direct D.C. power to the electric motor for the flow control valve for the function and incrementally open or close the valve to alter the flow rate and, therefore, the speed at which the function operates.

Another feature of the present invention is an output display visible to an operator. In the preferred embodiment, the output is a monitor which visually displays the timing of all of the functions with respect to a start time, and thereby permits an operator to continuously monitor the timings of the functions of the machine.

Several factors can influence the speed at which machines operate. Shops which operate several hydraulic or pneumatic machines often have a common source of pressurized liquid, and as a result, the hydraulic or pneumatic pressure to all operating machines may drop when a new machine is brought on line or it may rise when an operating machine is taken off line. Changes in operating pressure will change the speed at which the functions operate and, therefore, change the speed of the machine. Such shops often maintain skilled technicians who constantly monitor the machines to see that they are running at the optimum speed. The flow control valves of a machine fitted with the present invention will be regulated to increase or decrease fluid flow as needed to maintain optimum operating speed without requiring the attention of a technician.

The age of equipment, wear, environmental conditions such as temperature and humidity can also affect the speeds at which the functions of a machine will operate. Regardless of the reason for which the speeds of functions change, the present invention will compensate for those changes in speed by making appropriate changes to flow control valves and monitoring the consequences of those changes.

GENERAL DESCRIPTION OF THE DRAWINGS

A better and more complete understanding of the present invention will be had from a reading of the following detailed description taken in conjunction with the accompanying drawings wherein.

DETAILED DESCRIPTION OF A PREFERRED EMBODIMENT

Figure 1:
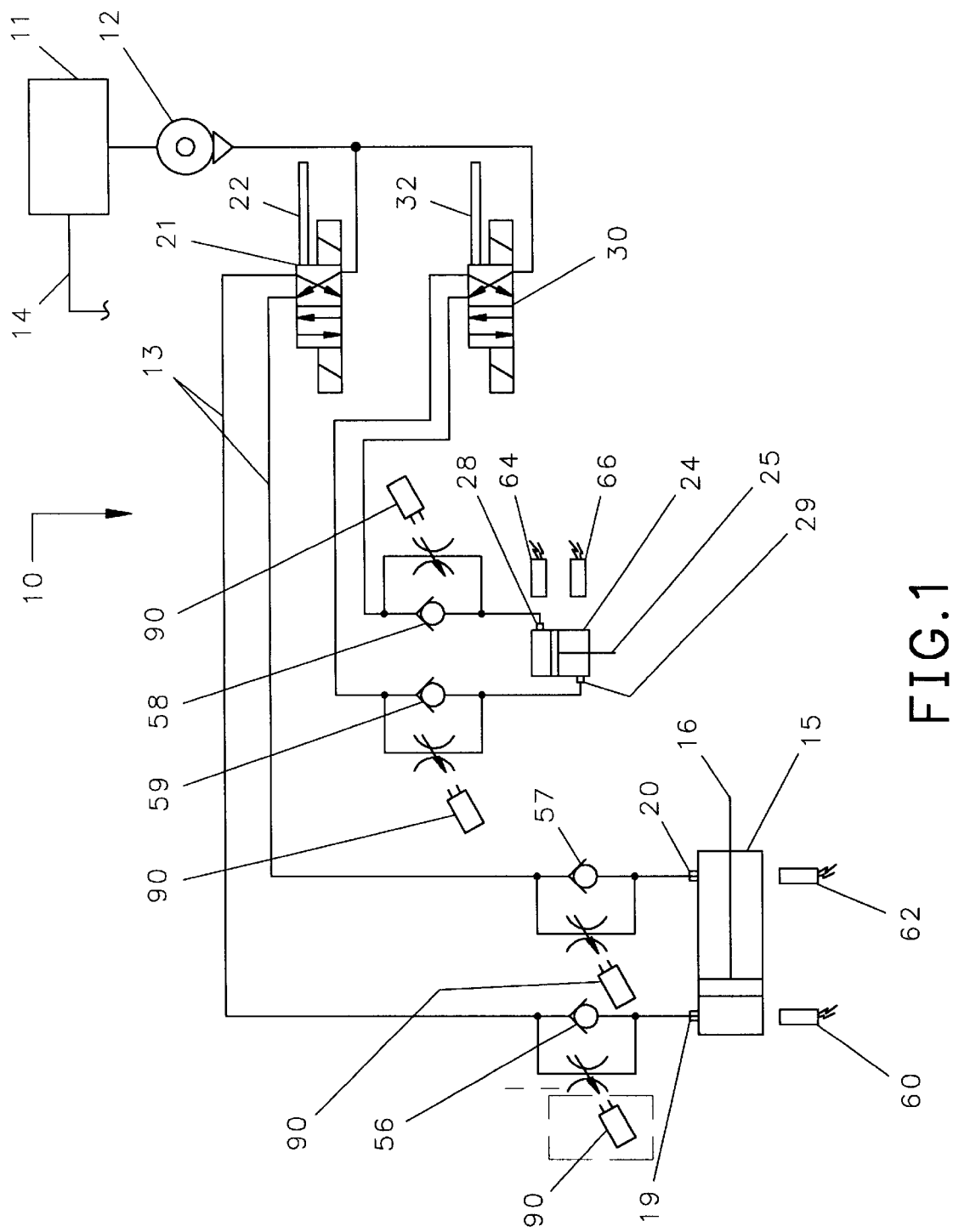
FIG. 1 is a simplified drawing of a machine having a plurality of cylinders and incorporating the present invention.

Referring to FIG. 1, a fluid operated machine 10 for performing a number of functions has a reservoir 11 for retaining hydraulic fluid, a motor driven pump 12 for pressurizing fluid in the reservoir, and a network of tubing, shown generally at 13, for directing pressurized fluid through the machine. A second network of tubing 14 returns fluid to the reservoir 11.

The machine 10 is depicted as having two successive functions with the first function performed by a first cylinder 15 having a piston rod 16 which is extendable from a retracted position, in which the distal end thereof is in a first start position to an extended first end position. Extending the first cylinder 15 is accomplished by directing fluid into a first port 19 and out a second port 20, and retracting the cylinder is accomplished by reversing the flow of fluid, the fluid then being entering through second port 20 and exiting through the first port 19.

The direction from which the fluid enters the cylinder 15 is determined by a valve 21 having a control arm 22, movable between a first position, in which pressurized fluid is directed into the first port 19 to extend the rod 16, and a second position in which pressurized fluid is directed into the second port 20 to retract the rod 16.

The machine has a second cylinder 24 with a second rod 25 which is movable between a second start position with the distal end thereof in a retracted position, to an extended second end position. The second cylinder 24 is moved inward or outward by fluid entering and exiting third and fourth ports 28, 29, respectively, on opposite sides thereof. A second valve 30 has a second control arm 32, which is movable between a first position in which the valve 30 directs pressurized fluid into the third port 28 to extend the rod 25, and a second position in which fluid is directed into the fourth port 29 to retract the rod 25.

When the distal end of the first rod 16 reaches the first end position, a first linkage engages the arm 22 and mechanically reverses the position of the first valve 21 to direct pressurized fluid through ports 20, 22 and thereby retract the first rod 16.

The extension of the first rod 16 to the end position also engages a second linkage with the second arm 32 to operate the second valve 30 to extend the second rod 25 causing it to move from the second start position to the second end position. When the second rod 25 reaches the second end position, it will mechanically engage a third linkage and reverse the second valve 30 to direct pressurized liquid through the associated ports and retract the second rod 26. After the first rod 16 has returned to the fully retracted position the first valve 21 will again be reversed to begin a new cycle of the machine 10.

If the pistons are to operate sequentially and the various components of the machine are appropriately timed, the second rod 25 will be fully retracted by the time the first rod 16 again reaches the first end position and the second linkage is engaged, and the second rod 25 will be fully retracted by the time the first rod 16 reaches the second end position.

It should be appreciated that although the start positions are described therein as occurring when the associated cylinders are fully retracted and all end positions are described as occurring when the cylinders are fully extended, the start and end positions can be considered to occur anywhere along the stroke of a cylinder. Furthermore, although the functions of the machine are described as having a one-to-one relationship, one cycle of one cylinder associated with one cycle of another, the functions may have relationships which are greatly different than one-to-one. Nonetheless, the relationship of functions of any machine can be reduced to start and end positions, which are signal positions for starting or ending other functions of the machine.

The speed at which the various cylinders 15, 24, of the machine 10 function are preset by adjusting the flow of liquid through manually operated regulator valves 56, 57, 58, 59, which regulate the flow rate of liquid being expelled from each of the ports 19, 20, 28, 29, respectively. Regulator valves 19 and 28 control the speed at which the cylinders 15, 24 are retracted and regulator valves 20 and 29 control the speed at which the cylinders 15, 24 are extended, respectively.

In accordance with the present invention, the machine 10 has a first detector 60 to detect when the distal end of the first rod 16 is in the first start position, a second detector 62 to detect when the first rod 16 is in the first end position, a third detector 64 to detect when the second rod 25 is in the second start position and a fourth detector 66 to detect when the second rod 25 is in the second end position. If the machine has a Programmable Logic Controller (PLC) it may already be fitted with detectors 60, 62, 64, 66 and both the PLC and the present invention may receive input from the detectors of the machine. If the machine does not already have detectors, the machine may be modified to receive the detectors. Also, to each of the manually operated regulator valves 56, 57, 58, 59 there is connected an electronically operated valve control 90 as described below.

Figure 2:
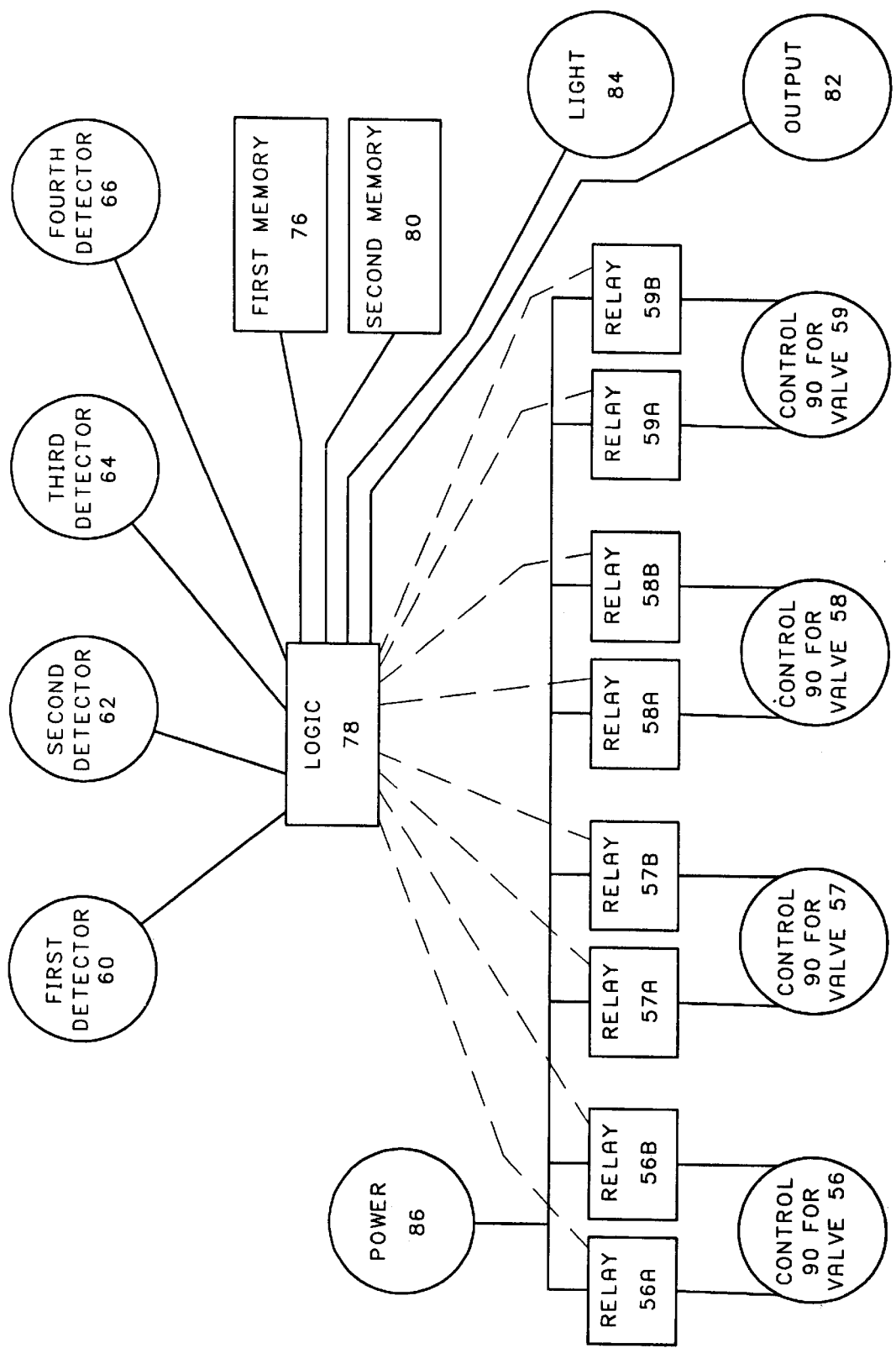
FIG. 2 is a schematic drawing of a device in accordance with the present invention.

Referring to FIG. 2, the outputs from each of the detectors 60, 62, 64, 66 are directed into a logic 78, which may be a computer. The timings of the outputs from the various detectors and, therefore, the timings of the movement of the cylinders 15, 24, for proper operating thereof including acceptable deviations, are stored in a first memory 76.

The actual timings of all functions are calculated from the detector outputs and the results are stored in a second memory 80 and a comparison of actual times to proper timing are displayed on an output 82, such as a screen. In the event the logic 78 determines that the timing of any of the functions is not within an accepted deviation of the given timing, a warning, such as a light 84, will be illuminated and draw an operator's attention to the malfunction. For example, in the event the second rod 25 was not fully retracted to the second start position 26 by the time the first rod 16 reaches its end position the timings calculated from the detectors would not be within the acceptable deviation and logic 78 would direct power to illuminate the warning light 84 thereby warning an operator of a timing problem.

Each of the controls 90 is connected to a source of DC electric power 86 by a pair of relays such that power can be directed through the control 90 in one direction to open the valve to which the controller is attached and in the opposite direction to close the valve. For simplicity, the relays associated with valve 56 bear indicia numbers 56A and 56B, and the relays for the remaining valves 57, 58, 59 bear similarly lettered indicia numbers. In the event the logic 78 determines that either the first rod 16 or the second rod 25 in not operating within the acceptable timing, the logic 78 will energize the appropriate relay for the valve associated with the improperly operating rod to incrementally open the valve of a slow operating function and thereby increase the speed thereof or incrementally close the valve of a fast operating function to slow the speed thereof. After the associated valve 56, 57, 58, 59 has been incrementally modified, the logic 78 will again calculate the timings of the functions and compare them to the proper timings stored in the memory.

Figure 3:
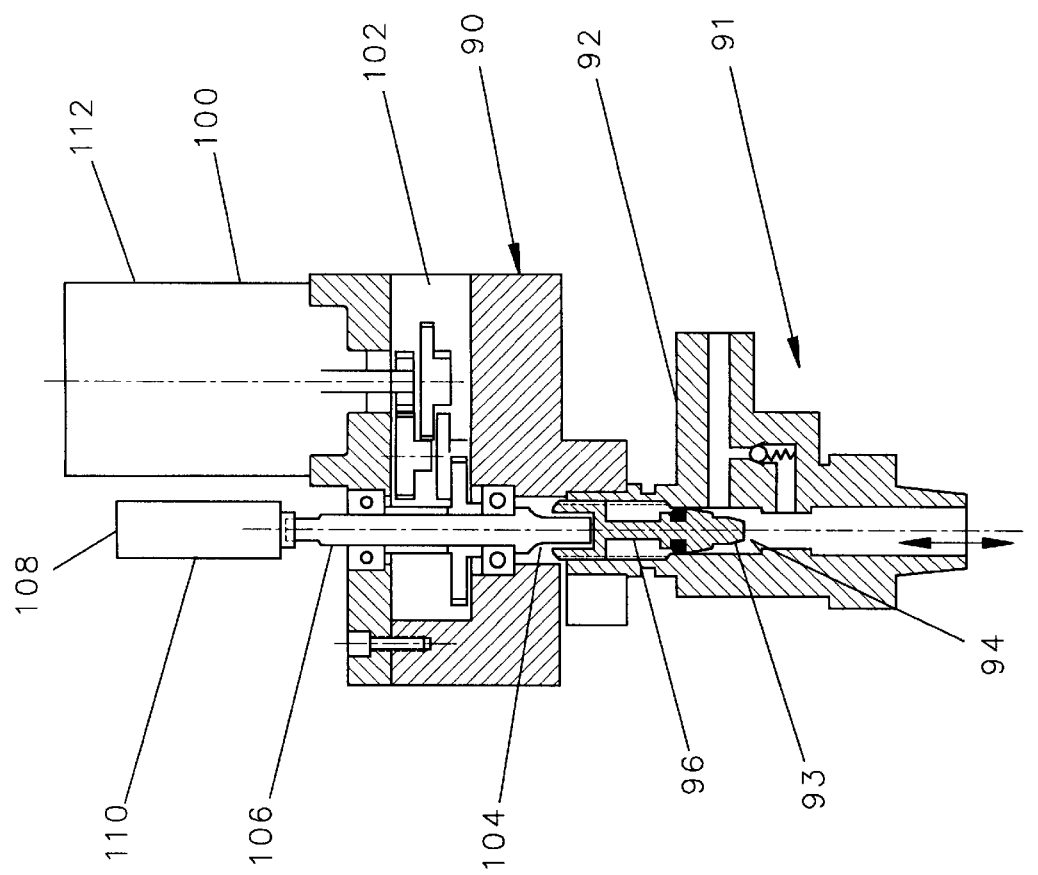
FIG. 3 is a cross-sectional view of a valve and control in accordance with the present invention.

Referring to FIG. 3, to adjust the flow rate for a function, an electronic valve control 90 is provided. The valve control 90 is attachable to a valve 91 of the type known in the art. The valve 91 has a valve body 92 in which a needle valve 93 is movable toward or away from a seat 94, by rotating a stem 96. The movement of the needle 93 toward the seat 94 restricts fluid flow, and the movement of the needle 93 away from the seat 94 opens fluid flow through the valve.

The control 90 includes a D.C. motor 100 which drives a gear box 102 having an output shaft with hexagonal lower end 104 and an upper end 106 to which a potentiometer 108 is attached.

The upper end of stem 96 of a typical regulator valve has a transverse slot such that the stem may be rotated with a screw driver. To attach a control 90 to a valve 91, an axial hole is drilled into the upper end of the stem 96 and the hole is shaped to receive the hexagonal lower end of the shaft 104 of the gear box 102.

The output 110 of the potentiometer 108 is connected to the logic 78 to provide feedback of the setting of the valve to which the control 90 is attached. Also, the logic 78 is connected to each of the relays to control the direction of electric energy to the DC motors 100.

If the logic determined that a function is operating improperly, the logic will energize the relay for the appropriate control 90 connected to one of the regulator valves 56, 57, 58, 59 controlling the speed of the function which is operating too rapidly or too slowly. Electric power will flow to the associated motor 100, and the appropriate valve will open or close until the timing thereof falls within the parameters established in the first memory 76.

The degree to which a control valve is opened or closed is shown by the potentiometer 108 and care must be taken during the installation of the control 90 to coordinate the setting of the potentiometer 108 to the setting of the valves. The potentiometer output must also be calibrated with the logic such that that voltage input received from the logic 78 correctly corresponds to the degree of opening of the valve. The logic, therefore, monitors both setting of the valves and speed of the functions.

It should be appreciated that proper timing of a machine may require the function to operate with overlapping relationships, and that the invention includes programming the logic to distinguish whether the functions are operating with proper synchronization or out of synchronization. The logic will record the timing from the outputs, and if they are not within permitted tolerances, the logic will direct power to the D.C. motors of the controller 90 to modify the associate flow rates and, therefore, the speeds of the cylinders to bring their timings within acceptable tolerances as stored in the first memory 76.

While embodiment of the present invention has been shown and described, it will be apparent to those skilled in the art that many changes and modifications may be made without departing from the true spirit and scope of the present invention. It is the intent of the appended claims to cover all such changes and modifications which fall within the true spirit and scope of the invention.

What is claimed:

1. The method of regulating a machine which has a first fluid operated function with a first start position and a first end position, a second fluid operated function with a second start position and a second end position, a first regulator valve for controlling the speed of said first function, a second regulator valve for controlling the speed of said second function, said first function and said second function having given timings for proper operation of said machine, said method comprising the steps of providing a first detector for detecting when said first function is in said first start position, providing a second detector for detecting when said first function is in said first end position, providing a third detector for detecting when said second function is in said second start position, providing a fourth detector for determining when said second function is in said second end position, providing a first memory, storing said given timings for said first function and said second function in said first memory, providing a second memory, calculating actual timing for said first function and said second function from outputs of said first detector, said second detector, said third detector and said fourth detector, storing said actual timing in said second memory, providing a visual output, displaying a comparison of said given timings and said actual timings on said output means.

2. The method of claim 1 and further including the steps of, determining an acceptable deviation from said given timing, providing a warning signal, activating said warning signal in the event one of said actual outputs is not within said acceptable deviation of a corresponding given timing.

3. The method of claim 1 and further comprising the steps of, providing an electronic control having a motor for opening and closing a regulator valve, attaching said electronic control to said first regulator valve, determining an acceptable deviation from said given timing for said first valve, comparing said actual timing to said given timings for said first valve, and adjusting said control for said first valve to bring said actual timing closer to said given timing thereof if said actual timing differs from said given timing by more than said acceptable deviation.

4. The method of maintaining a given operating rate for a fluid operated function in a machine where said rate is adjusted by a flow valve having a rotatable stem comprising the steps of, providing a control having an electric motor, and a rotatable output shaft, attaching said output shaft to said stem, providing a detector for detecting the rate at which said function is being performed, providing a source of electric power, providing a control means for controlling the direction of electric power from said source to said electric motor, providing a logic having a memory, storing said given operating rate in said memory, connecting said detector, and said control means to said logic for directing electric power to said motor to open said valve when said logic determines said rate of said function is less than said given rate and to close said valve when said logic determines said rate of said function is greater than said given rate.

5. The method of claim 4 wherein, said control includes a sensor for sensing the degree of opening of a valve to which said control is attached, and said sensor is connected to said logic whereby said logic can monitor the degree to which said valve is opened.

* * * * *